United States Patent Office 3,180,861
Patented Apr. 27, 1965

3,180,861
METHOD OF PRODUCING ACYL DERIVATIVES OF PENICILLIN
Kinichiro Sakaguchi, 119 Sanyamachi, Meguroku, Tokyo, Japan, and Sawao Murao, City Apartment R.C. 116, Omoricho, Tottori, Tottori Prefecture, Japan
No Drawing. Filed Dec. 4, 1961, Ser. No. 156,987
Claims priority, application Japan, Dec. 12, 1960, 35/49,019
2 Claims. (Cl. 260—239.1)

This invention relates to a method of synthesizing various types of penicillin by combining various acyl radicals chemically with penicin (or 6-amino-penicillanic acid, or 6-APA, as denominated by Batchelor), more specifically to a method of obtaining penicillin by adsorbing the penicin existing in a Penicillium culture medium or the penicin obtained through decomposition of various types of penicillin by various biochemical catalyzers having penicillin-amidase (the enzyme system, also named "Penicillin Acylase" by others, which causes the 6-position amide-combination to decompose into penicin (6–APA) and the corresponding acyl radicals) activities on active carbon and acylating this penicin as adsorbed on active carbon.

Since the Nature (January 1959 issue) published an article on a semi-synthesized penicillin, Beecham Laboratory of Great Britain and Bristol Laboratory of the United States have successively announced their new discoveries of a synthesized penicillin.

The conventional method of semi-synthesizing penicillin from penicin (6–APA) will be illustrated in the example of benzyl penicillin.

In the conventional practice the penicin (6–APA) contained in a Penicillium culture medium is first separated from the latter. Then, phenyl acetyl chloride is added to the separated penicin, and while controlling the pH of the mixture by sodium bicarbonate, etc., the amino radical of the penicin is acylated to obtain a synthesized penicillin (in this case penicillin G). The chemical formula of this reaction is as follows:

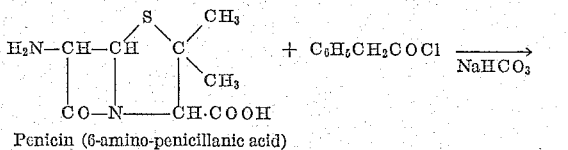

Penicin (6-amino-penicillanic acid)

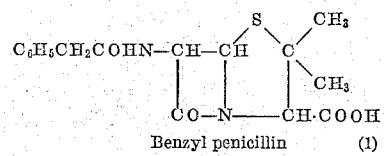

Benzyl penicillin    (1)

Penicin (6–APA) can be obtained by extraction from the residue of a Penicillium culture medium after it is deprived of penicillin; or by decomposing various types of penicillin, for instance, penicillin G, by means of penicillin amidase, a cell suspension or supernatant solution of cultured broth of penicillin amidase-producing bacteria, or a freeze-dried product of penicillin amidase-producing bacteria; and separating it from the product of decomposition. Therefore a commonly conceivable method of synthesizing penicillin from penicin (6–APA) is to react the penicin obtained as above with a reagent of acylation according to the Formula 1. However, according to the method described above, in which penicin (6–APA) is first separated and this penicin is acylated for synthesization of penicillin, the yield of penicillin is poor. This is presumably because penicin (6–APA) is essentially a substance unstable to alkali and heat; and in the process of extraction and concentration it is decomposed. Particularly the decomposition will be heavy and the yield will be extremely poor in the case of penicin being obtained through decomposition of penicillin by penicillin amidase and then being reacted with a reagent of acylation.

On the assumption that there must be a certain condition hidden in the above-mentioned process of penicin isolation that causes decomposition of penicin, the present inventors made intensive investigations and, upon experimentation of acylation of penicin as adsorbed on active carbon, found that the loss of penicin in the process of isolation can thus be cut down, the rate of acylation can be quite excellent, and penicillin can be synthesized with a high yield. The present invention has been perfected upon this knowledge.

Thus the objective of the present invention lies in offering a method of synthesizing penicillin from penicin (6–APA) with a high yield and also a method of first decomposing penicillin into penicin (6–APA) and then transforming from the latter into a new penicillin different from the original one with a high yield.

More concrete description of the present invention follows.

(1) PREPARATION OF PENICIN-CONTAINING SOLUTION (i) For instance, a filtrate of a culture media of *Penicillium chrysogenum* Q 176 in the C medium (lactose 30 g., polypepton 20 g., $NaNO_3$ 1.6 g., $KH_2PO_4$ 2.6 g., $MgSO_4 \cdot 7H_2O$ 0.5 g., $ZnSO_4 \cdot 7H_2O$ 0.02 g., distilled water 1000 ml. (pH 5.6~5.8)) or a solution of penicillin decomposition, which is obtained through treatment of a penicillin product, say a potassium salt of penicillin-G by penicillin amidase or biochemical catalyzers having penicillin amidase activities, is added with 1 normal hydrochloric acid to adjust the pH value to 2.0~2.8. Then a small amount of active carbon is added to it to remove traces of penicillin and after stirring and filtering the mixture, a penicin-containing solution is obtained.

(ii) Or the above-mentioned filtrate of Penicillium culture media or the solution of decomposed penicillin is extracted with ether at pH 2.0~2.8 to eliminate penicillin. Thus a penicin-containing solution is obtained.

In this manner a penicin-containing solution is prepared by either (i) or (ii) described above.

(2) TREATMENT OF ACTIVE CARBON

The above penicin-containing filtrate is adjusted to pH 6.6~7.0 by addition of 1 normal caustic soda solution; is added with active carbon at a rate of 5 to 20 g. per 100 ml.; and the mixture is stirred. After filtering it, the filtrate is discarded. When this active carbon is washed with distilled water (or the washing can be omitted sometimes), and then dried, there results a penicin-adsorbed active carbon.

In this process, the penicin (6–APA) in the above-mentioned penicin-containing solution can be almost wholly adsorbed on active carbon.

(3) ACYLATION OF PENICILLIN

The above-mentioned penicin-adsorbed active carbon is treated with sodium bicarbonate, and then with cooled acetone. After being shaken the mixture is usually added with an acetone solution of a reagent of acylation, for example an acyl chloride, and is further shaken for 20 to 30 minutes at room temperature. Again, it is added with some cooled distilled water to acquire 80 percent aqueous acetone, shaken and then filtered to acquire a penicillin-containing filtrate. Further the above-mentioned active carbon is eluted two to three times by 80% aqueous acetone so as to recover penicillin entirely therefrom.

Addition of sodium bicarbonate in this process is done to neutralize the hydrochloric acid produced as the result of acylation.

(4) COLLECTION OF PRODUCED PENICILLIN

From the penicillin-containing acetone solution obtained through the above-mentioned process, acetone is removed by vacuum distillation; and the product after removal is, if necessary, decolorized and then is freeze-dried or further refined through common procedure of extraction using butyl acetate. Thus a penicillin corresponding to the acyl compound used in the process can be obtained.

In the process by the present invention the following types of acyl chlorides can be utilized to obtain the corresponding types of penicillin:

$C_6H_5CH_2COCl$, 4-$HOC_6H_4CH_2COCl$, n-$C_5H_{11}COCl$, $CH_3CH_2CH{:}CHCH_2COCl$, $CH_3CH{:}CHCH_2CH_2COCl$, $CH_3(CH_2)_6COCl$, $C_6H_5OCH_2COCl$ $C_6H_5OCH(CH_3)COCl$, $C_6H_3(OCH_3)_2COCl$ $CH_2{:}CH_3CH_2SCH_2COCl$, etc.

As a reagent of acylation in this process any other acyl compound, besides acyl chloride, that can acylate the amino radical of penicin (6–APA) to produce a penicillin derivative, such as bromide, carboxylic acid anhydride or ester can be used.

The following are some examples of application of this invention.

Example 1

To a liter of aqueous solution of potassium salt of penicillin G (11,200 u./ml.) are added 5 liters of a penicillin-amidase containing enzyme solution, for example, a cultured broth of penicillin-amidase producing bacteria (if suspension of bacterial cell, supernatant solution of cultured broth, freeze-dried penicillin amidase-producing bacteria, or refined penicillin amidase enzyme preparation is used, the amount added shall be equivalent to that of this example in enzymatic activity), 5 liters of borate buffer solution of pH 8.2~8.4, and 200 ml. of toluol. The above mixture is allowed to incubate for 5 hours at 37° C. During the incubation, 95% or more of penicillin therein decomposes. Then the above solution is added with 1 normal hydrochloric acid to adjust pH to 2.0~2.8, followed by addition of 20 to 40 g. of active carbon. The resulting mixture is fully mixed and then filtered, and the filtrate is collected. Or the reacting solution is extracted 3 to 4 times at the same value of pH with ether to remove penicillin. By this process most of the residual penicillin can be eliminated. There is hardly any loss of penicin (6-amina penicillanic acid) in this process.

This solution after removal of penicillin is added with 1 normal caustic soda solution to adjust pH to 6.6~7.0. After the pH adjustment it is further added with 0.5 to 1.5 kg. of active carbon and thoroughly agitated. After that, it is filtered to collect the active carbon. The active carbon thus collected is washed with distilled water to an extent of 20 times the volume of the active carbon, 5 to 6 times in succession.

This penicin-adsorbed active carbon is added with 20 g. of sodium bicarbonate and 3 l. of cooled acetone solution. Thereafter, 3 liters of cooled acetone solution with 30 g. of $C_6H_5CH_2COCl$ dissolved therein is added while stirred, and then is thoroughly shaken for 30 minutes. Further, the above mixture is diluted with additional distilled water in such amount as to bring the proportion of acetone to 80~85%; is shaken for 20 minutes and then is filtered. From the active carbon obtained, the synthesized penicillin can be extracted by 80% acetone in two to three operations.

Freeze-drying of the residue of this solution after distillation of acetone at a low temperature will give 5 to 7 g. of crude penicillin G.

This crude product can be extracted and refined by the conventional method using butyl acetate.

This is an example of reclaiming penicillin G after it is once converted into penicin (6–APA), but instead of penicillin G used above, penicillin V or penicillin X may be substituted. Meanwhile, penicillin G can, similarly to this example, be acquired from the penicin (6–APA)-containing solution obtained from a cultured broth of Penicillium with or without addition of a precursor after removal of penicillin by adsorption.

Example 2

To one liter of aqueous solution of potassium salt of penicillin G (11,200 u./ml.) are added 5 liters of penicillin-amidase containing solution, 5 liters of borate buffer solution of pH 8.0~8.4 and 200 ml. of toluol. The mixture is left to react at 37° C. for 5 hours. In this reaction 95 to 98% or more of penicillin therein is decomposed into penicin (6–APA). To the resulting solution is added 1 normal hydrochloric acid to adjust pH to 2.0~2.8, after which 20 to 40 g. of active carbon is added and the mixture is fully agitated.

Then it is filtered to collect the filtrate. Or the above solution is subjected to 3 to 4 operations of ether extraction at the same pH and then the residual penicillin from the said solution; thereby hardly any loss of penicillin is observed.

The solution after removal of penicillin is added with 1 normal caustic soda solution to adjust pH to 6.6~7.0 and then added with 0.5~1.5 kg. of active carbon. The mixture is thoroughly agitated and then filtered to collect the active carbon. This active carbon is washed with additional distilled water, in volume 20 times that of the active carbon, 5 to 6 times in succession.

In this operation, the entire penicin (6–APA) produced in the said solution is practically adsorbed by the active carbon.

To this penicin-adsorbed active carbon are added 20 g. of sodium bicarbonate and 3 l. of cooled acetone solution. Further, 3 l. of cooled acetone solution with 33 g. of phenoxyacetyl chloride ($C_6H_5OCH_2COCl$) dissolved therein is added while stirred. The mixture is thoroughly shaken for 30 minutes. Then, it is diluted with cooled distilled water so that the proportion of acetone after cooling may be equal to 80~85 percent. The mixture is again shaken for 20 minutes and then filtered. The active carbon is further extracted 2 to 3 times by 80% acetone and thus the synthesized penicillin is dissolved.

When the residue of the solution after the acetone has been distilled and removed at a low temperature is freeze-dried, 5 to 7 g. of a crude product of a newly synthesized phenoxymethyl penicillin can be acquired. The product is then refined in accordance with the conventional process.

Example 3

A mixture of 1750 ml. of a cultured broth of T265, a penicillin amidase-producing strain of bacteria, 2250 ml. of borate buffer solution of pH 8.2, 12.50 g. of potassium salt of penicillin G and 150 ml. of toluol is placed in a 5-liter flask and allowed to incubate there at 37° C. for 5 hours. The concentration of penicillin in this mixture is initially 5,000 u./ml., but 215 u./ml. after conclusion of the incubation. (Accordingly, the rate of penicillin decomposition is 96%.) The above solution, after the residual penicillin therein has been removed through extraction by ether, is distilled under vacuum to eliminate the ether. Thereupon, 1 normal caustic soda is added thereto to adjust pH to 6.6~7.0 and then 400 g. of active carbon is added to adsorb penicin on the active carbon. The said active carbon, when air-dried, will weigh 860 g. of which 6.880 g. represents the adsorbed penicin (6–APA).

Next, the said carbon is poured into 10 liter flasks.

Thereafter, 4300 ml. of acetone solution with 8.60 g. of sodium bicarbonate dissolved therein is added to the said flask. After being cooled in an ice-chamber, it is again added with 210 ml. acetone solution of 6.9 g. of 2-phenoxypropionyl chloride; and further added with 1490 ml. of cooled acetone. Immediately thereafter, the content in this flask is shaken for 30 minutes and then diluted with 1500 ml. of cooled distilled water so as to produce 80 percent aqueous acetone. The diluted solutions are filtered after being shaken for 30 minutes. The active carbon is washed two times with this 80% aqueous acetone solution. After acetone is distilled and removed at a low temperature from the above filtrate, the residue is freeze-dried, producing about 12 g. of crude phenoxyethyl penicillin.

*Example 4*

By a similar operation to Example 3 using 7.5 g. of 2.6-dimethoxybenzoyl chloride, about 12 g. of crude 2.6-dimethoxyphenyl penicillin can be obtained.

*Example 5*

In a 300-ml. flask, 50 ml. of C culture medium earlier mentioned is placed and then sterilized by boiling it at 115° C. for 10 minutes. Thereafter, the content of the flask is inoculated with *Penicillium chrysogenum* Q176 and then cultivated under shaking at 25° to 30° C. for six days. Then, 1 liter of the cultured broth, i.e., equivalent to 20 such flasks, is collected and filtered. The filtrate is added with 1 normal hydrochloric acid to adjust pH to 2.0~2.8. The mixture is added with 20 g. of active carbon, and after thorough agitation, is filtered and the filtrate is retained. The active carbon left is washed with a small amount of distilled water and then added to the said filtrate. This filtrate after deprived of penicillin is added with 1 normal caustic soda to adjust pH to 6.6~7.0; again added with 50 g. of active carbon and the mixture is thoroughly agitated. After filtering the mixture, the active carbon left is collected. The collected carbon is washed 5 to 6 times with distilled water.

To this penicin-adsorbed active carbon are added 200 mg. of sodium bicarbonate and 200 ml. of cooled acetone. Again this mixture is added, while being stirred, with 100 ml. of cooled acetone with 50 mg. of phenyl acetic acid chloride dissolved therein, and then shaken for 30 minutes, after which it is so conditioned that the acetone proportion therein may be equal to 80~85%. Finally, the same operation as described in other examples is carried out to gain 100 mg. of crude penicillin G.

What is claimed is:
1. Method for the preparation of synthetic penicillin from a liquid containing 6-aminopenicillanic acid which comprises the steps of: adjusting the pH of said liquid to a value of approximately 7, adsorbing said 6-aminopenicillanic acid on active carbon, subjecting said adsorbed 6-aminopenicillanic acid in an inert organic medium, at approximately room temperature and in the presence of sodium bicarbonate, to the action of an acylating agent selected from the group consisting of $C_6H_5CH_2COCl$, $C_6H_5OCH_2COCl$, $C_6H_5OCH(CH_3)COCl$,

$$C_6H_3(OCH_3)_2COCl$$

$4\text{-}HOC_6H_4CH_2COCl$, $n\text{-}C_5H_{11}COCl$, $$CH_3CH_2CH{:}CHCH_2COCl$$

$CH_3CH{:}CHC_2H_4COCl$, $CH_3(CH_2)_6COCl$ and $$CH_3CH_2SCH_2COCl$$

2. Method for the preparation of synthetic penicillin from a liquid containing 6-aminopenicillanic acid which comprises the steps of: adjusting the pH of said liquid to a value of approximately 7, adsorbing said 6-aminopenicillanic acid on active carbon, subjecting said adsorbed 6-aminopenicillanic acid in an inert organic medium, at approximately room temperature and in the presence of sodium bicarbonate, to the action of an acylating agent selected from the group consisting of $$C_6H_5CH_2COCl$$

$C_6H_5OCH_2COCl$, $C_6H_5OCH(CH_3)COCl$, $$C_6H_3(OCH_3)_2COCl$$

$4\text{-}HOC_6H_4CH_2COCl$, $n\text{-}C_5H_{11}COCl$, $$CH_3CH_2CH{:}CHCH_2COCl$$

$CH_3CH{:}CHC_2H_4COCl$, $CH_3(CH_2)_6COCl$ and $$CH_3CH_2SCH_2COCl$$

and separating the reaction product.

References Cited by the Examiner
UNITED STATES PATENTS

| | | | |
|---|---|---|---|
| 2,941,995 | 6/60 | Doyle et al. | 260—239.1 |
| 2,951,839 | 9/60 | Doyle et al. | 260—239.1 |
| 3,079,305 | 2/63 | Kaufmann | 260—239.1 |

NICHOLAS S. RIZZO, *Primary Examiner.*